United States Patent
Rai et al.

(10) Patent No.: US 10,521,811 B2
(45) Date of Patent: Dec. 31, 2019

(54) OPTIMIZING ALLOCATION OF CONFIGURATION ELEMENTS

(71) Applicant: Tata Consultanacy Services Limited, Mumbai (IN)

(72) Inventors: Veerendra Kumar Rai, Hadapsar Pune (IN); Sanjit Mehta, Hadapsar Pune (IN); Praveen Chandak, Hadapsar Pune (IN); Ashish Kumar Jha, Hadapsar Pune (IN); Rutuja Maruti Patil, Hadapsar Pune (IN); Abhinary Puvvala, Hadapsar Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 497 days.

(21) Appl. No.: 14/513,757

(22) Filed: Oct. 14, 2014

(65) Prior Publication Data
US 2015/0106143 A1    Apr. 16, 2015

(30) Foreign Application Priority Data
Oct. 15, 2013   (IN) .......................... 3238/MUM/2013

(51) Int. Cl.
*G06Q 30/02* (2012.01)
*H04L 12/24* (2006.01)
*G06Q 10/06* (2012.01)

(52) U.S. Cl.
CPC . *G06Q 30/0206* (2013.01); *G06Q 10/063112* (2013.01); *H04L 41/5003* (2013.01)

(58) Field of Classification Search
None
See application file for complete search history.

(56) References Cited

U.S. PATENT DOCUMENTS

| | | | |
|---|---|---|---|
| 6,671,818 B1 * | 12/2003 | Mikurak ................ | G06Q 10/06 714/4.21 |
| 6,738,736 B1 | 5/2004 | Bond et al. | |
| 8,041,616 B2 | 10/2011 | Cullen et al. | |

(Continued)

OTHER PUBLICATIONS

CISCO, "Service Level Management: Best Practices White Paper", Document ID: 15117, Feb. 1, 2001, all pages.

(Continued)

*Primary Examiner* — Thomas L Mansfield
(74) *Attorney, Agent, or Firm* — Shumaker, Loop & Kendrick, LLP (57) ABSTRACT

Systems and methods for optimizing allocation of configuration elements in a service engagement. A plurality of Service Level Agreements (SLAs) corresponding to a service engagement is received. A Service Level Agreement (SLA) of the plurality of Service Level Agreements (SLAs) includes a plurality of configuration elements and a plurality of SLA compliances. A model is created by allocating a subset of the plurality of configuration elements to meet the SLA. The model is simulated to verify the plurality of SLA compliances being met by the subset allotted. Based on the simulation, a time series data indicating behavior of the model is obtained. The model is optimized to obtain an optimal allocation of the plurality of configuration elements. The model is optimized by allocating another subset of the plurality of configuration elements to meet the SLA.

5 Claims, 3 Drawing Sheets

(56) References Cited

U.S. PATENT DOCUMENTS

| | | | |
|---|---|---|---|
| 8,041,797 B2 | 10/2011 | Childress et al. | |
| 8,781,882 B1* | 7/2014 | Arboletti | G06Q 10/0639 |
| | | | 705/7.11 |
| 9,818,127 B2* | 11/2017 | Iyoob | G06Q 30/0206 |
| 2004/0107125 A1* | 6/2004 | Guheen | G06Q 99/00 |
| | | | 705/319 |
| 2006/0161883 A1* | 7/2006 | Lubrecht | G06Q 10/06 |
| | | | 717/104 |
| 2007/0006177 A1* | 1/2007 | Aiber | G06Q 10/10 |
| | | | 717/136 |
| 2007/0294406 A1* | 12/2007 | Suer | G06Q 10/06 |
| | | | 709/226 |
| 2008/0046303 A1 | 2/2008 | Gordon et al. | |
| 2008/0112321 A1* | 5/2008 | Ricketts | G06Q 10/04 |
| | | | 370/235 |
| 2009/0018812 A1* | 1/2009 | Kothari | G06Q 10/04 |
| | | | 703/22 |
| 2010/0088759 A1* | 4/2010 | Abzarian | G06F 21/554 |
| | | | 726/21 |
| 2010/0299153 A1* | 11/2010 | Curtis | H04L 43/0817 |
| | | | 705/1.1 |
| 2011/0231320 A1* | 9/2011 | Irving | G06Q 30/00 |
| | | | 705/80 |
| 2011/0295999 A1* | 12/2011 | Ferris | G06F 9/5072 |
| | | | 709/224 |
| 2012/0089410 A1* | 4/2012 | Mikurak | G06Q 10/00 |
| | | | 705/1.1 |
| 2012/0124211 A1* | 5/2012 | Kampas | G06F 9/50 |
| | | | 709/226 |
| 2012/0158821 A1* | 6/2012 | Barros | G06F 9/5055 |
| | | | 709/203 |
| 2012/0226808 A1* | 9/2012 | Morgan | G06F 9/5072 |
| | | | 709/226 |
| 2012/0250575 A1* | 10/2012 | Chiang | H04L 41/0823 |
| | | | 370/254 |
| 2013/0060945 A1* | 3/2013 | Allam | G06F 9/5072 |
| | | | 709/226 |
| 2013/0185413 A1* | 7/2013 | Beaty | G06F 9/5072 |
| | | | 709/224 |
| 2014/0068075 A1* | 3/2014 | Bonilla | H04L 41/0823 |
| | | | 709/226 |
| 2014/0136571 A1* | 5/2014 | Bonvin | G06F 16/2219 |
| | | | 707/792 |
| 2014/0282536 A1* | 9/2014 | Dave | G06Q 30/0631 |
| | | | 718/1 |
| 2014/0324647 A1* | 10/2014 | Iyoob | G06Q 40/12 |
| | | | 705/30 |

OTHER PUBLICATIONS

Robert Gormley, "Service Improvement", Part 3 the Strategic View, Aug. 10, 2009, all pages, The University of Edinburgh, http://www.is.ed.ac.uk/itil.

Atos Origin, "Pricing Capacity-on-Demand in IT services", An analysis of the development of unit pricing at Atos Origin, 2005, all pages, Atos Origin, School of Economics and Commercial Law.

Team Quest, "Capacity Planning Discipline for Data Center Decisions", TQ-EB01 Rev. A., May 27, 2006, all pages, TeamQuest Corporation.

* cited by examiner

OPTIMIZING ALLOCATION OF CONFIGURATION ELEMENTS

CROSS-REFERENCE TO RELATED APPLICATION

This Application claims priority from Indian Patent Application No. 3238/MUM/2013filed on Oct. 15, 2013, the entirety of which is incorporated by reference herein.

FIELD OF INVENTION

The present disclosure in general relates to a field of service engagement in production support services. More particularly, the present disclosure relates to systems and methods for optimizing allocation of configuration elements in the service engagement.

BACKGROUND

In the information technology (IT) enterprises, information services are provided by computer resource suppliers and are consumed by information services consumers. Generally, the information services are provided based on requirements specified for Service Level Agreements (SLA) that have been agreed between a client and a vendor. The vendor may commit to deliver certain services to the client in a particular time. The vendor may need to consider resources that are available in the enterprise to meet the service level agreement.

It is important for the vendor to determine the resources that may be used to meet the service level agreement. For example, the vendor may have to determine the resources required such as hardware, software, or human resource required across multiple locations in order to meet user defined constraints and requirements or the SLAs. In order to adequately plan the resources required to meet the SLA, the vendor may have to forecast the resources that may have to be allotted for a particular task.

Traditional approaches for allotting the resources determines requirements of the services for the operational resources that are needed to meet the service level agreements. However, the traditional approaches provide optimizing either the operating resources or costs associated with the operating resources. Further, the traditional approaches do not consider various factors that are required to determine the costs for the operational resources allotted. For example, the traditional approaches do not consider constraints associated in the service level agreement to determine the resources required.

SUMMARY

This summary is provided to introduce concepts related to systems and methods for optimizing allocation of configuration elements in a service engagement and the concepts are further described below in the detailed description. This summary is not intended for use in determining or limiting the scope of the claimed subject matter.

In one implementation, a method for optimizing allocation of configuration elements in a service engagement is disclosed. The method includes receiving, by a processor, a plurality of Service Level Agreements (SLAs) corresponding to a service engagement between a client and a vendor. A Service Level Agreement (SLA) of the plurality of Service Level Agreements (SLAs) includes a plurality of configuration elements and a plurality of SLA compliances. The plurality of configuration elements indicates factors facilitating the execution of the service engagement to meet the SLA. The plurality of SLA compliances indicates a plurality of pre-defined conditions agreed between the client and the vendor to meet the SLA. The method further includes creating, by the processor, a model to meet the plurality of SLA compliances. The model is created by allocating a subset of the plurality of configuration elements to meet the SLA. The method further includes simulating, by the processor, the model in order to verify the plurality of SLA compliances being met by the subset allotted. The method further includes obtaining, by the processor, a time series data indicating behavior of the model. The time series data obtained shows utilization/performance of the subset allotted for a predefined time interval. The method further includes optimizing, by the processor, the model to obtain an optimal allocation of the plurality of configuration elements. The model is optimized by allocating another subset of the plurality of configuration elements.

In one implementation, a system for optimizing allocation of configuration elements in a service engagement is disclosed. The system includes a processor and a memory coupled to the processor. The processor executes program instructions stored in the memory, to receive a plurality of Service Level Agreements (SLAs) corresponding to a service engagement between a client and a vendor. A Service Level Agreement (SLA) of the plurality of Service Level Agreements (SLAs) includes a plurality of configuration elements and a plurality of SLA compliances. The plurality of configuration elements indicates factors facilitating the execution of the service engagement to meet the SLA. The plurality of SLA compliances indicates a plurality of pre-defined conditions agreed between the client and the vendor to meet the SLA. The processor further executes the program instructions to create a model to meet the plurality of SLA compliances. The model is created by allocating a subset of the plurality of configuration elements to meet the SLA. The processor further executes the program instructions to simulating the model in order to verify the plurality of SLA compliances being met by the subset allotted. The processor further executes the program instructions to obtain a time series data indicating behavior of the model. The time series data obtained shows utilization/performance of the subset allotted for a predefined time interval. The processor further executes the program instructions to optimize the model to obtain an optimal allocation of the plurality of configuration elements for the subset. The model is optimized by allocating another subset of the plurality of configuration elements.

In one implementation, a non-transitory computer readable medium embodying a program executable in a computing device for optimizing allocation of configuration elements in a service engagement is disclosed. The program includes a program code for receiving a plurality of Service Level Agreements (SLAs) corresponding to a service engagement between a client and a vendor. A Service Level Agreement (SLA) of the plurality of Service Level Agreements (SLAs) includes a plurality of configuration elements and a plurality of SLA compliances. The plurality of configuration elements indicates factors facilitating the execution of the service engagement to meet the SLA. The plurality of SLA compliances indicates a plurality of pre-defined conditions agreed between the client and the vendor to meet the SLA. The program further includes a program code for creating a model to meet the plurality of SLA compliances. The model is created by allocating a subset of the plurality of configuration elements to meet the SLA. The program further includes a program code for simulating the model in order to verify the plurality of SLA compliances being met by the subset allotted. The program further includes a program code for obtaining a time series data indicating behavior of the model. The time series data obtained shows utilization/performance of the subset allotted for a predefined time interval. The program further includes a program code for optimizing the model to obtain an optimal allocation of the plurality of configuration elements for the subset. The model is optimized by allocating another subset of the plurality of configuration elements.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to refer like/similar features and components.

DETAILED DESCRIPTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings. In addition, the words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Disclosed are systems and methods for optimizing allocation of configuration elements in a service engagement. The service engagement may comprise an agreement between a client and a vendor. The vendor may have to allot configuration elements at a facility of the vendor to meet the service engagement. For allotting the configuration elements, at first, a plurality of Service Level Agreements (SLAs) corresponding to a service engagement between the client and the vendor may be received. A Service Level Agreement (SLA) of the plurality of Service Level Agreements (SLAs) comprises a plurality of configuration elements and a plurality of SLA compliances. The plurality of configuration elements indicates factors facilitating the execution of the service engagement to meet the SLA. The plurality of SLA compliances indicates a plurality of pre-defined conditions agreed between the client and the vendor to meet the SLA.

In order to allot the plurality of configuration elements, a model may be created to meet the plurality of SLA compliances. The model may be created by allocating a subset of the plurality of configuration elements to meet the SLA. The model may be simulated to verify the plurality of SLA compliances being met by the subset allotted. After simulating the model based on the subset allotted, a time series data indicating behavior of the model may be obtained. The time series data obtained may show utilization/performance of the subset allotted for a predefined time interval.

Based on the performance of the subset allotted, the model may be optimized to obtain an optimal allocation of the plurality of configuration elements. The model may be optimized by allocating another subset of the plurality of configuration elements.

While aspects of described system and method for optimizing allocation of configuration elements in a service engagement may be implemented in any number of different computing systems, environments, and/or configurations, the embodiments are described in the context of the following exemplary system.

Figure 1:
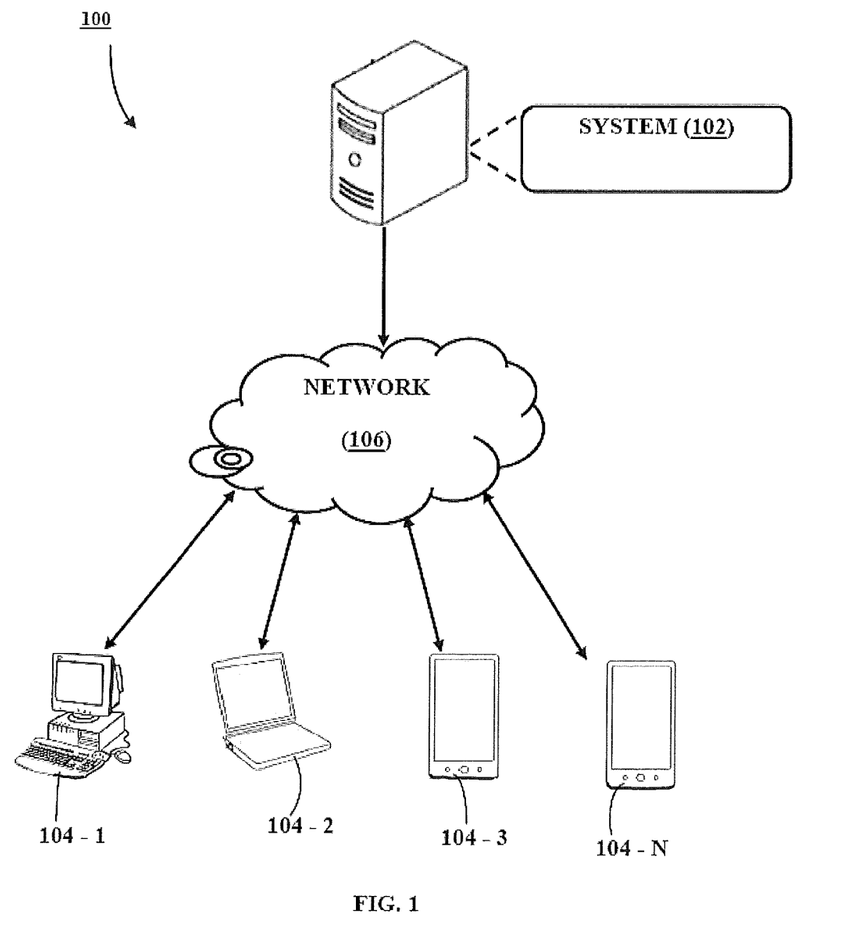
FIG. 1 illustrates a network implementation of a system for optimizing allocation of configuration elements in a service engagement, in accordance with an embodiment of the present disclosure.

Referring now to FIG. 1, a network implementation 100 of a system 102 for optimizing allocation of configuration elements in a service engagement is illustrated, in accordance with an embodiment of the present disclosure. The system 102 may receive a plurality of Service Level Agreements (SLAs) corresponding to a service engagement between the client and the vendor. A Service Level Agreement (SLA) of the plurality of Service Level Agreements (SLAs) may comprise a plurality of configuration elements and a plurality of SLA compliances. The system 102 may create a model to meet the plurality of SLA compliances. The model may be created by allocating a subset of the plurality of configuration elements to meet the SLA. After creating the model, the system 102 may simulate the model to verify the plurality of SLA compliances being met by the subset allotted. Subsequent to simulating, the system 102 may obtain a time series data indicating behavior of the model. From the time series data obtained, the system 102 may observe performance of the subset allotted for a predefined time interval.

Based on the performance of the subset allotted, the system 102 may optimize the model to obtain an optimal allocation of the plurality of configuration elements. The system 102 may optimize the model by allocating another subset of the plurality of configuration elements.

Although the present disclosure is explained by considering a scenario that the system 102 is implemented as an application on a server. It may be understood that the system 102 may also be implemented in a variety of computing systems, such as a laptop computer, a desktop computer, a notebook, a workstation, a mainframe computer; a server, a network server, and the like. It will be understood that the system 102 may be accessed by multiple users through one or more user devices 104-1, 104-2, 104-3 . . . 104-N collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
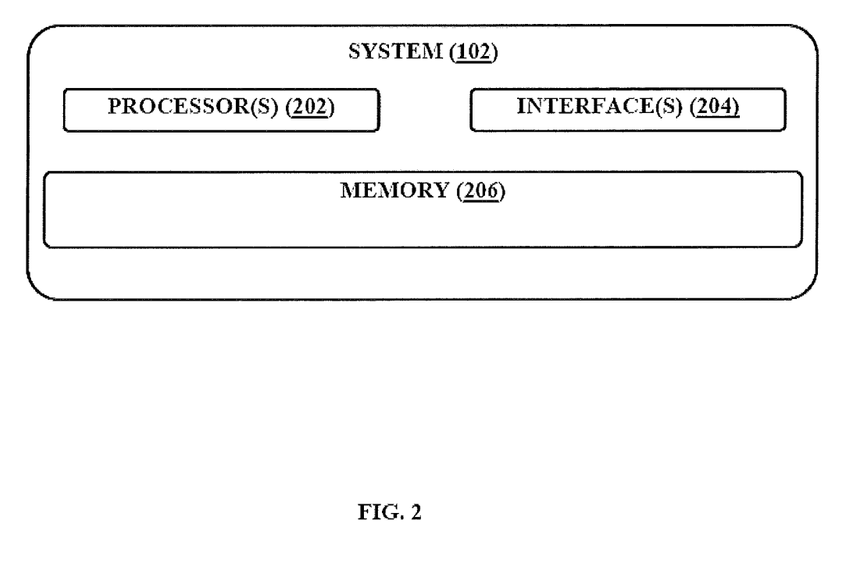
FIG. 2 illustrates the system, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, an Application Program Interface (API) and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In one implementation, at first, a user may use the client device 104 to access the system 102 via the I/O interface 204. The working of the system 102 may be explained in detail using FIG. 2, FIG. 3 and FIG. 4 explained below. The system 102 may be used for optimizing allocation of configuration elements in a service engagement.

In order to optimize allocation of configuration elements in the service engagement, at first, the system 102 may receive a plurality of Service Level Agreements (SLAs) corresponding to the service engagement between the client and the vendor. The service engagement may indicate an arrangement made between the client and the vendor such that the vendor delivers certain services to achieve objectives of the client. In one example, the service engagement may include the vendor providing services to the client to build a datacenter at a facility of the client. In another example, the service engagement may include the vendor providing services to a product of the client for a certain period of time e.g. one year. The vendor may indicate a service provider to the client i.e., an organization. The client may employ the vendor to achieve objectives of the client.

The client may employ the vendor based on the SLA negotiated with the vendor. In one example, the SLA may include terms for measuring service accountability of a ticket assigned to the vendor. In one example, the terms may include time committed by the vendor to deliver the project.

A SLA of the plurality of SLAs may comprise a plurality of configuration elements and a plurality of SLA compliances. The plurality of configuration elements indicates factors facilitating the execution of the SLA. The plurality of configuration elements may comprise at least one of resources, constraints, tickets, and a location. The plurality of SLA compliances indicates a plurality of pre-defined conditions agreed between the client and the vendor to meet the SLA. In other words, the SLA compliance indicate adherence of the vendor to meet the SLA in a given time. In one example, the SLA compliance may indicate the terms agreed by the vendor to deliver the project e.g. one year.

As presented above, the plurality of the configuration elements may comprise the resources. The resources may be employed based on the constraints, the tickets, and the location of the vendor to meet the SLA. As per the SLA, the client may raise a request in a form of the ticket. The ticket may indicate a task that the client requests the vendor to fulfill in a given time. In one example, the ticket may include the request to install/upgrade an application in a database of the client. Based on the request, the vendor may install/upgrade the application in the database of the client. In order to process the request, the tickets may be allotted to the resources of the vendor. In one implementation, the tickets may have to be distributed across the resources to process the request. The tickets may be distributed across the configuration elements based on a type of the ticket or frequency of the ticket that the vendor may receive. The tickets may comprise a plurality of attributes. In one example, the plurality of attributes may comprise competency, expertise level, priority of the tickets, and time required to meet the plurality of the SLA compliances. In one example, a ticket may require a specific competence by the configuration elements to resolve the request. Based on the expected competence required, the ticket may be distributed among the plurality of configuration elements. Based on the expected competence required, the tickets may be distributed on a basis of priority or type of the competency specified.

The resources may comprise employees or databases required to meet the SLA. In order to process the ticket received from the client, the employees or the databases that are available may have to be optimally allotted. In one implementation, details of the employees may be received from the database. Similarly, number of the databases available may be considered to allot the resources. In one implementation, the details may be stored in the memory 206. In one example, the details of the employees may comprise details such as shifts timings in which the employees work, cost of an employee, the type of competency an employee comprises and an expertise level an employee has. Based on the available resources, the tickets may have to be allotted based on the constraints.

The constraints may comprise user-defined constraints or service level constraints. The user defined constraints may comprise number of the shifts the employees are working and timings within which the employees work. The service level constraints may be defined in the SLA. In one example, the service level constraints may comprise compliance levels required for different SLAs in the service engagement. For example, the service level constraints may comprise maximum response time that the vendor may take for processing a ticket, maximum resolution time for each ticket type, and lower resolution time for ticket type of higher priority, etc.

The location indicates where the service engagement may be carried out. In one example, for a particular SLA, the configuration elements may be used from a single location to meet the SLA. In another example, the configuration elements may be used from at least two locations to meet the SLA.

For allotting optimum configuration elements to meet the SLAs, the system 102 may create a model. The model may be created by allocating a subset of the plurality of configuration elements to meet the SLA. The subset of the plurality of configuration elements indicates selecting a portion of the plurality of configuration elements to meet the SLAs based on the service engagement. For example, consider the SLA requires particular ticket to be completed in a span of one month. Further, consider the resources comprise the employees having higher level or lower level expertise to process the tickets raised. Based on the SLA requirements, the system 102 may create a model by selecting the resources with the lower level expertise to complete the ticket in one month. Similarly, if the SLA comprises a ticket that requires the ticket to be processed by the employees with a mixture of higher level and lower level expertise, the system 102 may create the model comprising the resources with a mixture of as higher level and lower level expertise.

For the above example, the system 102 may consider several factors to allocate the plurality of configuration elements. For example, the plurality of configuration elements may comprise applications, network components, database servers, and mainframes. The vendor may comprise the resources that may be grouped into functions. The resources may be grouped to meet the SLAs. The plurality of configuration elements may be allotted to meet the SLAs such as an event management, a request fulfillment, an incident management, a problem management, and an access management.

The event management may indicate a process of analyzing, and planning to meet the objectives of the client by the vendor. For example, the vendor may analyze and plan number of resources required for executing a project for the client in a year. The request fulfillment may indicate information provided by the vendor to the client based on a request raised by the client. In one example, the client may raise a request in a form of a ticket. In one example, the ticket may include the request to install/upgrade an application in a database of the client. Based on the request, the vendor may install/upgrade the application in the database of the client. The incident management may indicate response time taken by the vendor to resolve an issue of the client. In one example, consider a break down in a network of the client to access the database. The client may request the vendor to check an error to fix the network. The amount of time the vendor takes to fix the network e.g. one hour may be considered for the incident management.

The problem management may indicate managing problems that occur during tenure of the service engagement. In one example, measures taken by the vendor to prevent the problems from occurring. For example, the measures taken by the vendor to prevent break down in the network may be considered as the problem management. In another example, the measures taken by the vendor to eliminate recurring incidents and to minimize the impact of incidents that cannot be prevented may be considered as the problem management. The access management may be indicative controlling access to view the information of the client for personnel at an organization of the vendor or client. For example, the vendor may grant access to the data of the client to the personnel who have authority in the organization. Similarly, the vendor may restrict or deny access to the data of the client to the personnel who do not have authority in the organization.

Based on the plurality of configuration elements available, the vendor may have to allot optimal configuration elements to meet the SLA. Therefore, the vendor may allot a set of the plurality of configuration elements based on the pre-defined conditions agreed. In order to allot the subset, the vendor may have to consider several factors. The factors may comprise the resources available, the location and the constraints. The resources may comprise roles and responsibilities, skills and competencies, shifts, the configuration elements that are to be supported, and functions of the resources.

In one embodiment, the resources to be allotted for the subset may be calculated using effort requirements for each of configuration elements. The effort requirements may comprise the number of Full Time Equivalent (FTE) required, skills training and experience for each FTE and assignment of roles and responsibilities to the resources. Further, the location of the resource and the shift timing of the resource may be considered to determine the subset. Further, the skill of the resource may be categorized based on an expertise level of the resource. For example, the resource at expertise level 1 may indicate the resource comprising less expertise to process the ticket. The resource at expertise level 3 may indicate the resource comprising more expertise to process the ticket.

After calculating the resources for the subset, costs associated with the subset may be determined. In order to determine the cost for the subset, costs associated with the FTE requirements and fixed cost per FTE for the distribution of the resources may be considered. Further, cost for each ticket may be determined and a margin that is to be kept may be defined. In one implementation, the cost for each ticket may be determined based on the configuration elements allotted and the distribution of the tickets to the configuration elements allotted. After determining the cost of each ticket, cost per FTE and fixed cost per FTE, a total cost for the subset may be obtained.

The costs for the subset may be determined by considering fixed and variable costs associated while allotting the configuration elements. In one implementation, the cost of the subset may be determined using at least one of a fixed cost, a variable cost and a combination of fixed and variable. For determining the fixed cost, total costs for the subset may be considered for the configuration elements in the SLA. For determining the variable cost, as volume of the tickets may be not assured, the costs may be calculated based on the resources available and volume of the tickets expected.

In order to obtain the costs for the SLA, it may be necessary to estimate the volume of tickets that is expected. The volume of the tickets may be estimated using knowledge of earlier estimation that might have been carried out. Further, the volume of the tickets expected may be determined using an average number of the tickets based on requirements specified in the SLA and calculating the number of the tickets that are arriving per hour based on a Poisson distribution. The Poisson distribution may be plotted as may be known in the art.

For example, consider the SLA comprises Customer relationship management (CRM) that requires the volume of the tickets to be estimated. In order to estimate the volume of tickets, at first, mean of hourly rate of the tickets based on earlier estimation may be determined. Further, assume that the average of forty tickets per hour is estimated based on the earlier estimation for the CRM. By plotting the Poisson distribution, the average for the number of the tickets for each hour may be estimated. The average estimated for the above example may be nearly forty with less number of tickets falling above or below forty. Based on the volume of the tickets estimated, number of the resources required to resolve the tickets may be calculated. Further, the costs for the resources required to resolve the ticket may be calculated.

In the combination of fixed and variable cost, cost per ticket for each of the configuration element and additional cost of the additional resource may be determined. For determining the additional cost, specific variable cost per ticket may be considered for the configuration element wherein the cost varies based on volume of the tickets. In one implementation, the fixed cost may be selected if volume of the tickets and total costs for the tickets to be used are known. In one implementation, the variable cost may be used if the volume of the tickets are known and cost for the tickets are unknown or vice versa. In one implementation, the combination of the fixed and variable cost may be used when the cost for the ticket is known and additional cost of the additional resources to be used for the tickets is not known.

In order to illustrate allotting the subset to create the model, Table 1 may be used as an example. Specifically, Table 1 illustrates the SLA indicating how the configuration elements might be distrusted based on the SLA compliance levels agreed in the service engagement.

TABLE 1

Table 1: SLA

| SLA | |
|---|---|
| No. of Shifts | 3 |
| Duration of each Shift | 8 hr. |
| Types of Competencies | 5 |
| No. of Expertise level in each Competency | 3 |
| Ticket priority Levels | 4 |

Based on the SLA, the vendor may have to allot the plurality of configuration elements considering the SLA compliance. In one example, the SLA compliance for the above example may be presented in Table 2.

TABLE 2

Table 2: SLA compliance

| Ticket Priority | SLA Compliance period (in min.) | Minimum SLA Compliance Level (%) |
|---|---|---|
| Priority Critical (4) | 30 | 96 |
| Priority High (3) | 40 | 95 |
| Priority Medium (2) | 45 | 94 |
| Priority Low (1) | 55 | 90 |

Based on the SLA and the SLA compliance, the vendor may allot the configuration elements for the set to meet the SLA. The vendor may create the model considering the configuration elements required to meet the SLA. The vendor may receive details such the resources available and distribution of the tickets to the resources based on the expertise level. Further, the costs associated with the resources to engage on the tickets may be determined. In one example, the costs per hour for the resources may be determined as shown in Table 3. Specifically, Table 3 illustrates the cost of the resource based on the expertise level and the competency type of the resource.

TABLE 3

Table 3: Costs per hour for the resources

| Resource Type | Resource Cost |
|---|---|
| Competency Type 1 | |
| Expertise Level 1 | 15 |
| Expertise Level 2 | 45 |
| Expertise Level 3 | 75 |
| Competency Type 2 | |
| Expertise Level 1 | 30 |
| Expertise Level 2 | 60 |

After allotting the configuration elements and determining the costs based on the allotment for the subset, the model may be simulated. The model may be simulated to provide information of the SLA that may be expected based on the resources allotted for the subset for a pre-defined interval. In one example, the simulation may show the optimal resources required corresponding to the model to resolve the ticket. For example, the simulation may show parameters required to resolve the ticket. The parameters may comprise number of tickets arrived per competency, number of tickets solved at each expertise level of each competency, number and percentage of the tickets resolved within the SLA compliance specified time limits, utilization rate of the employees, etc. The model may be simulated to verify the SLA compliances being met by the subset allotted. The model may be simulated to obtain a time series data indicating behavior of the model. The time series data obtained may show performance of the subset allotted for a predetermined time interval. For example, the time series data may show how the resources can be used for the subset over a period of one year.

For example, consider the model presented in Table 1, 2 and 3. After simulating the model with the number of employees of each competency and each expertise levels to be 3, results may be obtained as below.

TABLE 4

Table 4: Simulation results for the model

| Parameter | Simulation result |
|---|---|
| Priority Critical (4) Compliance level | 97.34% |
| Priority High (3) Compliance level | 96.32% |
| Priority Medium (2) Compliance level | 94.19% |
| Priority Low (1) Compliance level | 92.41% |
| Average Employee Utilization | 65.42% |

From Table 4, it may be observed that for the resources allotted, the employees per competency type and the expertise level 3 has low utilization of the resources to meet the SLA. In order to reduce the cost, the model may be optimized by modifying the subset allotted for the model. Consider that the model may be optimized by allotting the employees per competency type and the expertise level 2. Based on the subset that is modified, the model may be simulated. For the resources allotted for the subset, the simulation may provide results as presented in Table 5.

TABLE 5

Table 5: Simulation results

| Parameter | Simulation result |
|---|---|
| Priority Critical (4) Compliance level | 96.47% |
| Priority High (3) Compliance level | 95.37% |
| Priority Medium (2) Compliance level | 93.48% |
| Priority Low (1) Compliance level | 91.08% |
| Average Employee Utilization | 88.72% |

Based on the simulation, the optimal resources required to meet the SLA may be estimated. In one example, the model may be simulated based on the SLA compliance specified for the SLA. For example, consider the SLA compliance specified to meet the SLA is 95%. For the SLA compliance specified, the model may be simulated using the costs determined for the subset allotted. In one example, the SLA may specify that the SLA compliance to be 95%. The SLA compliance may be specified based on priority of the tickets, e.g., the SLA may be specified that the SLA compliance to be of 98% for critical tickets, 96% for high priority tickets and 93% for low priority tickets. In one implementation, there might be penalties for not meeting requirements specified in SLA. The penalties may indicate the costs associated with not meeting the SLA. In one example, the penalty may be specified as—for each percentage point of the SLA compliance that is missed, the vendor may be liable to pay the client or have the amount deducted from the vendor fees e.g., thousand. Based on the penalty, profit for the vendor may be determined for the SLA. In one implementation, the profit may be determined as revenue from the SLA minus the cost of the employees, other costs and the penalty for not meeting the SLA. The other costs may include cost of infrastructure and the resources such as computers, databases, etc.

In one implementation, the model may be simulated to see the SLA compliance in an order of critical, high, medium, and low. The simulation obtained may show a status of the SLA such that the subset for the model may be realloted with the resources.

Based on the performance of the subset allotted to meet the SLA, the model may be optimized. The model may be optimized by allocating another subset of the plurality of configuration elements. Thus, the model may be optimized to obtain an optimal allocation of the plurality of configuration elements. For example, if the performance of the model declines over a period of time, then the subset allotted may replaced with the another subset. In one example, another subset of the plurality of configuration elements may indicate engaging the resources with high expertise level to meet the SLA and thereby meeting the SLA compliance.

In one implementation, the model may be optimized to minimize the costs associated with the subset allotted, distribution of the tickets in a specified location and shift. For example, if the resource cannot resolve a ticket, the ticket may be given to a resource of high expertise level for resolution. The tickets may be distributed such that the ticket is resolved to meet the SLA compliance e.g. one day period to resolve the ticket. If the SLA compliance is not met, then the system 102 may modify the resources allotted for the model and may simulate the model to optimize the model. For example, the system 102 may modify the resources allotted by increasing the number of resources allotted to meet the SLA. The model may be modified until an optimal allocation of the configuration elements are obtained for the subset.

In order to explain allotting of the configuration elements to meet the SLA, an example may be used. Consider the contextual variables for the service engagement are the location, shifts and the number of tickets received per hour. In one example, consider there are two locations, 1 and 2. Consider location 1 has three shifts and location 2 has two shifts. Further consider the number of tickets expected is as per an hour. Table 6 may be used to illustrate the model comprising the constraints that are to be considered for the SLA and the context variables for the service engagement.

TABLE 6

Table 6: Constraints of the SLA and the context variables for the service engagement

| Location | Shift | Ticket Volume (/hour) | SLA level | Competency Required |
|---|---|---|---|---|
| 1 | 1 | 30 | 95.00% | 1, 2 |
| 1 | 2 | 35 | 97.00% | 1, 2 |
| 1 | 3 | 30 | 95.00% | 1, 3 |
| 2 | 1 | 27 | 94.00% | 2, 3 |
| 2 | 2 | 34 | 97.00% | 3 |

A subset of the configuration elements may be allotted to meet the SLA. For the above example, the resources may be allotted as shown in Table 7.

TABLE 7

Table 7: Allocation of the resources

| Location | Shift | Competency | Number of resources |
|---|---|---|---|
| 1 | 1 | 1 | 2 |
| 1 | 1 | 2 | 2 |
| 1 | 2 | 1 | 3 |
| 1 | 2 | 2 | 3 |
| 1 | 3 | 1 | 3 |
| 1 | 3 | 3 | 2 |
| 2 | 1 | 2 | 2 |
| 2 | 1 | 3 | 2 |
| 2 | 2 | 3 | 5 |

Based on the resources allotted for the model, the model may be simulated. After simulating the model, the utilization of the resources to meet the SLA compliance may be determined. For the model discussed above, the utilization of the resources may be obtained and the results may be presented in Table 8.

TABLE 8

Table 8: Simulation of the resource utilization

| Location | Shift | Utilization | SLA Compliance |
|---|---|---|---|
| 1 | 1 | 79.00% | 96.00% |
| 1 | 2 | 87.00% | 91.00% |

TABLE 8-continued

Table 8: Simulation of the resource utilization

| Location | Shift | Utilization | SLA Compliance |
|---|---|---|---|
| 1 | 3 | 86.00% | 93.00% |
| 2 | 1 | 80.00% | 96.00% |
| 2 | 2 | 90.00% | 89.00% |

From the results, if the allocation of the plurality of configuration elements for the subset is as per the SLA, the resources allotted may be considered as optimal. If the resources allotted are not optimal to meet the SLA, the model may be optimized by allocating another subset of the plurality of configuration elements. Consider another subset of the plurality of configuration elements is allotted as shown in Table 9.

TABLE 9

Table 9: Allotment of another subset of the plurality of configuration elements

| Location | Shift | Competency | Number of resources |
|---|---|---|---|
| 1 | 1 | 1 | 2 |
| 1 | 1 | 2 | 1 |
| 1 | 2 | 1 | 4 |
| 1 | 2 | 2 | 5 |
| 1 | 3 | 1 | 3 |
| 1 | 3 | 3 | 4 |
| 2 | 1 | 2 | 2 |
| 2 | 1 | 3 | 1 |
| 2 | 2 | 3 | 6 |

Based on the plurality of configuration elements allotted for the model i.e., another subset, the model may be simulated. Based on the simulation, the utilization of the resources to meet the SLA compliance may be determined. For the plurality of configuration elements allotted as shown in Table 9, the utilization of the resources may be obtained and the results may be presented as Table 10.

TABLE 10

Table 10: Simulation of the resource utilization

| Location | Shift | Utilization | SLA Compliance |
|---|---|---|---|
| 1 | 1 | 88.00% | 95.30% |
| 1 | 2 | 81.00% | 97.20% |
| 1 | 3 | 79.00% | 96.10% |
| 2 | 1 | 86.00% | 94.80% |
| 2 | 2 | 81.20% | 97.20% |

Based on the results obtained after simulating the model for the subset and another subset, the model that may be suitable to meet the SLA may be selected. If the model is not suitable, the plurality of configuration elements allotted may be changed and the model may be simulated to obtain the optimal allocation of the configuration elements.

Figure 3:
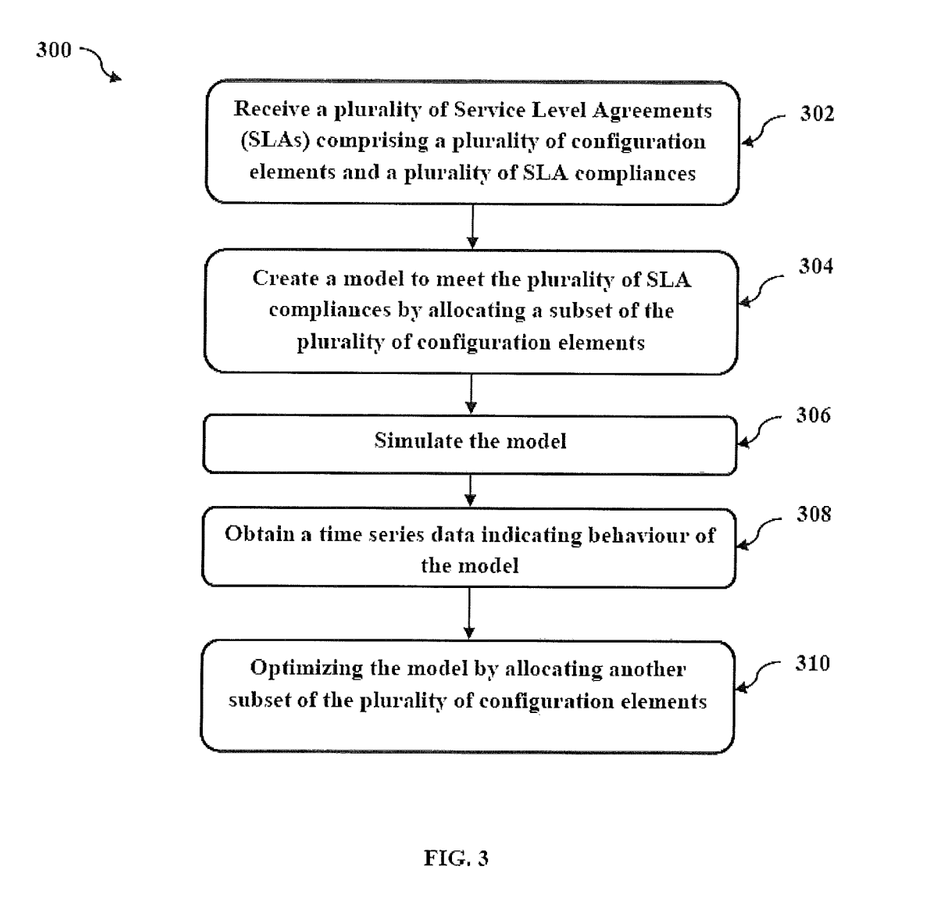
FIG. 3 illustrates a method for optimizing allocation of configuration elements in a service engagement, in accordance with an embodiment of the present disclosure.

Referring now to FIG. 3, a method 300 for optimizing allocation of configuration elements in a service engagement is shown, in accordance with an embodiment of the present disclosure. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described and is not intended to be construed as a limitation, and any number of the described method blocks can be combined in any order to implement the method 300 or alternate methods. Additionally, individual blocks may be deleted from the method 300 without departing from the spirit and scope of the disclosure described herein. Furthermore, the method may be implemented in any suitable hardware, software, firmware, or combination thereof. However, for ease of explanation, in the embodiments described below, the method 300 may be implemented in the above-described system 102.

At step/block 302, a plurality of Service Level Agreements (SLAs) corresponding to a service engagement between a client and a vendor may be received. A Service Level Agreement (SLA) of the plurality of Service Level Agreements (SLAs) comprises a plurality of configuration elements and a plurality of SLA compliances. The plurality of configuration elements indicates factors facilitating the execution of the SLA. The plurality of SLA compliances indicates a plurality of pre-defined conditions agreed between the client and the vendor to meet the SLA.

At step/block 304, a model may be created to meet the plurality of SLA compliances. The model may be created by allocating a subset of the plurality of configuration elements to meet the SLA.

At step/block 306, the model may be simulated to verify the plurality of SLA compliances being met by the subset allotted.

At step/block 308, a time series data indicating behaviour of the model may be obtained. The time series data obtained may show utilization/performance of the subset allotted for a predefined time interval.

At step/block 310, the model may be optimized to obtain an optimal allocation of the plurality of configuration elements for the subset. The model may be optimized by allocating another subset of the plurality of configuration elements.

Although implementations of system and method for optimizing allocation of configuration elements in a service engagement have been described in language specific to structural features and/or methods, it is to be understood that the appended claims are not necessarily limited to the specific features or methods described. Rather, the specific features and methods are disclosed as examples of implementations for optimizing allocation of configuration elements.

The invention claimed is:

1. A method for optimizing allocation of configuration elements in a service engagement, the method comprising:
receiving, by a processor, a plurality of Service Level Agreements (SLAs) corresponding to a service engagement between a client and a vendor, wherein a Service Level Agreement (SLA) of the plurality of Service Level Agreements (SLAs) comprises a plurality of configuration elements and a plurality of SLA compliances, and wherein the plurality of configuration elements indicates factors facilitating the execution of the service engagement to meet the SLA, and wherein the plurality of configuration elements comprises resources, applications, network components, database servers, mainframes allotted based on service level constraints, tickets, and location of the vendor to meet the plurality of SLAs, and wherein the plurality of SLA compliances indicates a plurality of pre-defined conditions agreed between the client and the vendor to meet the SLA, wherein the location of the vendor corresponds to the location for carrying out the service engagement, wherein each ticket is processed by ascertaining availability of a number of databases to allot the resources, wherein the resources are employees required to meet the SLA and details of the employees are stored in the database and obtained from the database while processing each ticket;

creating, by the processor, a model to meet the plurality of SLA compliances, wherein the model is created by allocating a subset of the plurality of configuration elements to meet the SLA by calculating effort requirements for each of the configuration elements, wherein the model is created with a mixture of a higher level expertise and a lower level expertise of employees;

simulating, by the processor, the model in order to verify the plurality of SLA compliances being met by the subset allotted;

obtaining, by the processor, a time series data indicating behavior of the model, wherein the time series data obtained shows utilization/performance of the subset allotted for a predefined time interval;

optimizing, by the processor, the model to obtain an optimal allocation of the plurality of configuration elements for the subset by allocating another subset of the plurality of configuration elements which replaces the subset allotted while creating the model, upon determining that the performance of the resources declined over a period of time, and simulating the model with the another subset of the plurality of configuration elements to determine the utilization of resources that meets the plurality of SLA compliances;

calculating, by the processor, costs associated with the model to meet the plurality of SLA compliances, wherein the costs are calculated based on at least one of the plurality of configuration elements allotted to the model and contextual variables including the location, shifts and the number of tickets received per hour; and obtaining results of simulating the model for the subset and the another subset and determining suitability of the model to meet the SLA, and changing the allotted plurality of configuration elements and simulating the model with the changed plurality of configuration elements to obtain the optimal allocation of the plurality of configuration elements if the model is determined unsuitable to meet the SLA.

2. The method of claim 1, wherein the tickets comprise a plurality of attributes, wherein the plurality of attributes comprises competency, priority of the tickets, expertise level and time required to meet the plurality of the SLA compliances, wherein the tickets are distributed across the plurality of configuration elements based on one of the priority of the tickets, a frequency of the ticket received by the vendor and competency of the plurality of the configuration elements.

3. A system implemented on a server for optimizing allocation of configuration elements in a service engagement, the system comprising:
a processor; and
a memory coupled to the processor, wherein the processor executes program instructions stored in the memory, to:

receive a plurality of Service Level Agreements (SLAs) corresponding to a service engagement between a client and a vendor, wherein a Service Level Agreement (SLA) of the plurality of Service Level Agreements (SLAs) comprises a plurality of configuration elements and a plurality of SLA compliances, and wherein the plurality of configuration elements indicates factors facilitating the execution of the service engagement to meet the SLA, and wherein the plurality of configuration elements comprises resources, applications, network components, database servers, mainframes allotted based on service level constraints, tickets, and location of the vendor to meet the plurality of SLAs, and wherein the plurality of SLA compliances indicates a plurality of pre-defined conditions agreed between the client and the vendor to meet the SLA, wherein the location of the vendor corresponds to the location for carrying out the service engagement, wherein each ticket is processed by ascertaining availability of a number of databases to allot the resources, wherein the resources are employees required to meet the SLA and details of the employees are stored in the database and obtained from the database while processing each ticket;

create a model to meet the plurality of SLA compliances, wherein the model is created by allocating a subset of the plurality of configuration elements to meet the SLA by calculating effort requirements for each of the configuration elements, wherein the model is created with a mixture of a higher level expertise and a lower level expertise of employees;

simulate the model in order to verify the plurality of SLA compliances being met by the subset allotted;

obtain a time series data indicating behavior of the model, wherein the time series data obtained shows utilization/performance of the subset allotted for a predefined time interval;

optimize the model to obtain an optimal allocation of the plurality of configuration elements for the subset by allocating another subset of the plurality of configuration elements which replaces the subset allotted while creating the model, upon determining that the performance of the resources declined over a period of time, and simulate the model with the another subset of the plurality of configuration elements to determine the utilization of resources that meets the plurality of SLA compliances;

calculate costs associated with the model to meet the plurality of SLA compliances, wherein the costs are calculated based on at least one of the plurality of configuration elements allotted to the model and contextual variables including the location, shifts and the number of tickets received per hour; and obtain results of simulating the model for the subset and the another subset and determining suitability of the model to meet the SLA, and changing the allotted plurality of configuration elements and simulating the model with the changed plurality of configuration elements to obtain the optimal allocation of the plurality of configuration elements if the model is determined unsuitable to meet the SLA.

4. The system of claim 3, wherein the tickets comprise a plurality of attributes, wherein the plurality of attributes comprises competency, priority of the tickets, expertise level and time required to meet the plurality of the SLA compliances, wherein the tickets are distributed across the plurality of configuration elements based on one of the priority of the tickets, and a frequency of the ticket received by the vendor and competency of the plurality of the configuration elements.

5. A non-transitory computer readable medium embodying a program executable in a computing device for optimizing allocation of configuration elements in a service engagement, the program comprising:

a program code for receiving a plurality of Service Level Agreements (SLAs) corresponding to a service engagement between a client and a vendor, wherein a Service Level Agreement (SLA) of the plurality of Service Level Agreements (SLAs) comprises a plurality of configuration elements and a plurality of SLA compliances, and wherein the plurality of configuration elements indicates factors facilitating the execution of the service engagement to meet the SLA, and wherein the plurality of configuration elements comprises resources, applications, network components, database servers, mainframes allotted based on service level constraints, tickets, and location of the vendor to meet the plurality of SLAs, and wherein the plurality of SLA compliances indicates a plurality of pre-defined conditions agreed between the client and the vendor to meet the SLA, wherein the location of the vendor corresponds to the location for carrying out the service engagement, wherein each ticket is processed by ascertaining availability of a number of databases to allot the resources, wherein the resources are employees required to meet the SLA and details of the employees are stored in the database and obtained from the database while processing each ticket;

a program code for creating a model to meet the plurality of SLA compliances, wherein the model is created by allocating a subset of the plurality of configuration elements to meet the SLA by calculating effort requirements for each of the configuration elements, wherein the model is created with a mixture of a higher level expertise and a lower level expertise of employees;

a program code for simulating the model in order to verify the plurality of SLA compliances being met by the subset allotted;

a program code for obtaining a time series data indicating behavior of the model, wherein the time series data obtained shows utilization/performance of the subset allotted for a predefined time interval;

a program code for optimizing the model to obtain an optimal allocation of the plurality of configuration elements for the subset by allocating another subset of the plurality of configuration elements which replaces the subset allotted while creating the model, upon determining that the performance of the resources declined over a period of time, and simulating the model with the another subset of the plurality of configuration elements to determine the utilization of resources that meets the plurality of SLA compliances;

a program code for calculating costs associated with the model to meet the plurality of SLA compliances, wherein the costs are calculated based on at least one of the plurality of configuration elements allotted to the model and contextual variables including the location, shifts and the number of tickets received per hour; and a program code for obtaining results of simulating the model for the subset and the another subset and determining suitability of the model to meet the SLA, and changing the allotted plurality of configuration elements and simulating the model with the changed plurality of configuration elements to obtain the optimal allocation of the plurality of configuration elements if the model is determined unsuitable to meet the SLA.

* * * * *